July 17, 1928.
D. REED
FLOAT VALVE
Filed March 29, 1927
1,677,687
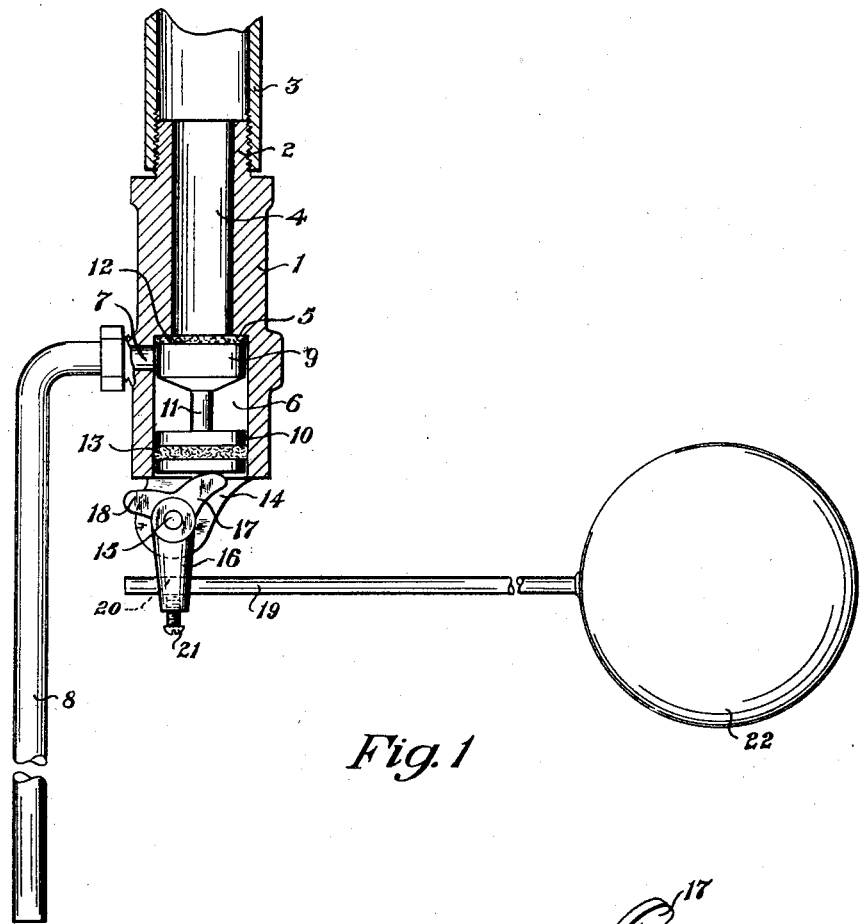
Fig. 1
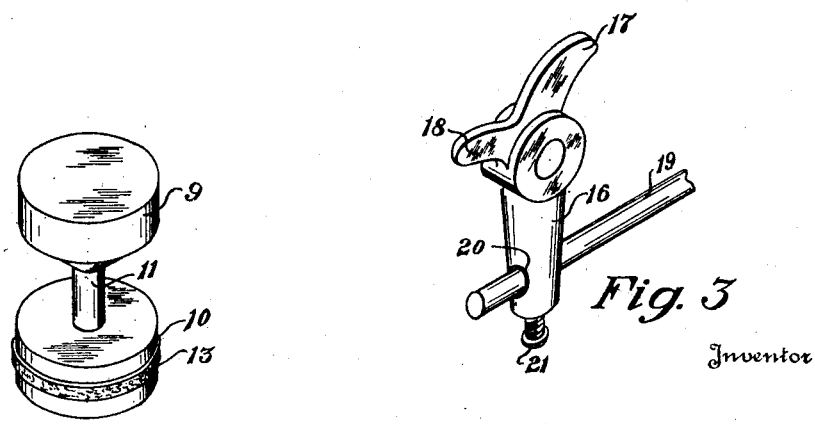
Fig. 2
Fig. 3
Inventor
Dudley Reed
By Freast and Bond
Attorneys Patented July 17, 1928.

1,677,687

UNITED STATES PATENT OFFICE.

DUDLEY REED, OF CANTON, OHIO.

FLOAT VALVE.

Application filed March 29, 1927. Serial No. 179,262.

This invention relates to float valves of the type in which a valve is mounted within a valve casing inside of a tank and is closed by the water level within the tank raising a float ball secured to a lever.

The object of the invention is to provide a valve of this character in which the valve is normally held in raised position to shut off the supply of water to the tank and is opened by gravity together with the water pressure thereon when the float ball is lowered in the tank by the receding water level therein.

An embodiment of the invention is illustrated in the accompanying drawing, in which:

Figure 1 is a sectional view of the improved valve showing the same in raised or closed position, the inlet to the tank from the valve, and the float ball lever being shown attached thereto;

Fig. 2, a detached perspective view of the valve; and

Fig. 3, a similar view of the operating lever and a portion of the rod which carries the float ball.

Similar numerals refer to similar parts throughout the drawing.

The valve casing 1 is adapted to be positioned in the upper portion of a flushing tank of any suitable and well known design, preferably near one end thereof.

The upper reduced end 2 of this valve casing may be screw threaded to receive the water supply pipe 3 which enters the upper portion of the tank and connects the valve casing with a water main or supply.

The upper portion of the valve casing is provided with the inlet passage 4 terminating in the shouldered valve seat 5 beneath which is the enlarged valve chamber 6, the upper portion of which is provided with the port 7 communicating with the downturned pipe 8 which may extend to a point near the bottom of the flushing tank.

The valve is vertically slidably located in the chamber 6 and preferably comprises the spaced heads 9 and 10 connected as by the neck portion 11.

The upper head 9 is arranged to engage the gasket or washer 12 provided upon the valve seat 5 and the lower head 10 is provided with a peripheral washer or gasket 13 to prevent leakage.

The lower end of the valve chamber 6 is open and ears 14 preferably depend from opposite sides thereof, a pin 15 being located therethrough to pivotally mount the operating lever 16.

This lever is pivoted at one side of the axis of the valve chamber, as illustrated in Fig. 1 and provided with the curved arm 17 arranged to engage the under surface of the head 10 of the valve, a shorter oppositely disposed stop arm 18 being provided for contact with the lower end of the valve casing to limit the movement of the lever in that direction.

A rod 19 has one end located through a transverse opening 20 in the depending arm of the lever 16 and connected thereto as by the set screw 21, the float ball 22, of any well known structure being connected to the free end of this rod.

When the water level within the tank is at the maximum, the float ball 22 will be raised to the position shown in Fig. 1, swinging the lever 16 upon its pivot to the position illustrated, whereby the arm 17 holds the valve in the raised or closed position, holding the upper end of the head 9 tightly in engagement with the valve seat, preventing the water supply from passing downward from the supply pipe 3 to the pipe 8.

When the tank is flushed in the usual manner, the receding water level permits the float ball rod to drop, moving the lever arm 17 downward and permitting the valve to drop by gravity as well as by the water pressure from above, opening the port 7 and permitting the water from the supply pipe 3 to pass through the port 7 to the pipe 8.

In this position the stop arm 18 will engage the lower end of the valve casing, preventing further downward movement of the valve. The parts will remain in this position until the tank has again been filled to the required level when the float ball will rise, closing the valve and bringing the parts to the position shown in Fig. 1.

From the above it will be obvious that a very simple and efficient valve construction is provided wherein the valve is raised while in the closed position and is lowered by gravity together with the downward pressure of the water.

I claim:

1. A valve of the character described including a vertically disposed casing having a valve seat intermediate its ends, an inlet pipe communicating with the upper end of the casing, an outlet pipe communicating with the casing just below the valve seat, a vertically movable valve within the casing, a pivot below the valve and offset from the axis of the valve, a lever below the valve on the pivot for normally holding the valve in raised position against the valve seat, a stop arm upon the lever for limiting the downward movement of the valve, said lever having a depending arm radially disposed from the pivot, and a rod carrying a float ball mounted on the depending arm at right angles thereto.

2. A valve of the character described including a vertically disposed casing having a valve seat intermediate its ends, an inlet pipe communicating with the upper end of the casing, an outlet pipe communicating with the casing just below the valve seat, a vertically movable valve within the casing, a pivot below the valve and offset from the axis of the valve, a lever below the valve provided with a curved arm on the pivot for normally holding the valve in raised position against the valve seat, a stop arm upon the lever for limiting the downward movement of the valve, said lever having a depending arm radially disposed from the pivot, and a rod carrying a float ball mounted on the depending arm at right angles thereto.

In testimony that I claim the above, I have hereunto subscribed my name.

DUDLEY REED.